Jan. 13, 1931.　　　K. W. HUGHES　　　1,788,674

ARTIFICIAL BAIT HOLDER

Filed April 18, 1928

INVENTOR.
Kent W. Hughes.
BY
Eccleston & Eccleston,
ATTORNEYS.

Patented Jan. 13, 1931

1,788,674

UNITED STATES PATENT OFFICE

KENT W. HUGHES, OF LIMA, OHIO

ARTIFICIAL-BAIT HOLDER

Application filed April 18, 1928. Serial No. 271,022.

This invention relates to holders for artificial baits and has for its object to provide such a device which is simple and inexpensive in construction, and which will retain the bait in position within the container without the use of a closure as found in prior devices.

Another object of the invention resides in the provision of a bait holder of transparent material which not only serves to display the bait without removal from the holder but also automatically grips the bait and retains it in proper position for display or inspection.

A further object of the invention consists in the construction of a bait holder which provides ample means for circulation of air to dry the baits and also affords means to facilitate removal of the bait from the holder.

Other objects and advantages of the invention will be apparent from the following description taken in connection with the accompanying drawing; in which Figure 1 is a perspective view of the holder with a lure mounted therein.

Figure 1:
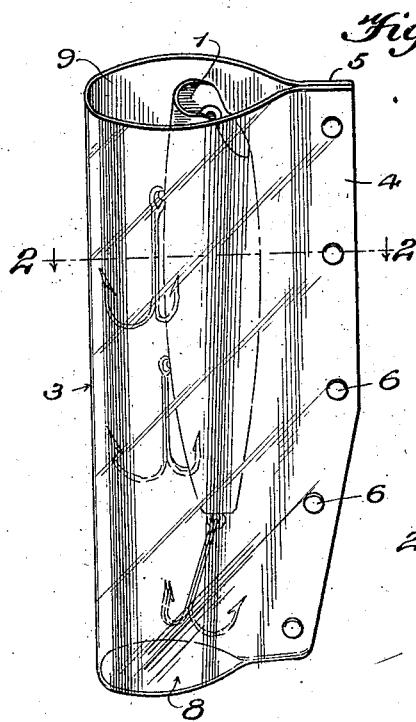

Referring to the drawing in greater detail, the numeral 1 indicates the body of a lure or artificial bait to which is attached gang hooks 2. This lure is of conventional form and is represented herein merely to indicate the manner in which any type of artificial bait or lure may be positioned within the container or holder to be described.

The bait holder as depicted herein is shown as formed from a sheet 3 of transparent resilient material such as celluloid, and while it is preferable that the material be transparent in order to permit an inspection of the artificial bait without removing the same from the container, nevertheless the holder may be made of a sheet of opaque resilient material.

Figure 2:
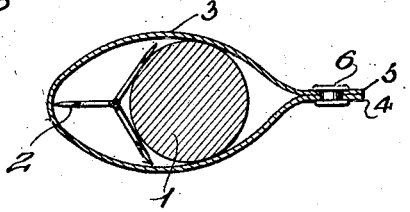
Figure 2 is a sectional view taken on line 2—2 of Figure 1.
Figure 3:
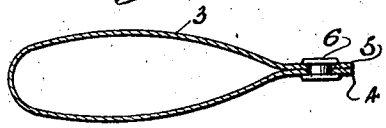
Figure 3 is a cross sectional view through the holder with the lure removed.

The sheet 3 of celluloid or the like is folded or doubled upon itself so as to bring its longitudinal edges 4 and 5 into contact as indicated in Figures 1, 2 and 3. The sides 4 and 5 are then flattened against each other and rivets or other fastening means 6 passed through both edges so as to securely lock these edges together. The sheet after being folded and secured assumes the substantially oval cross sectional shape as indicated in Figure 3.

Figure 4:
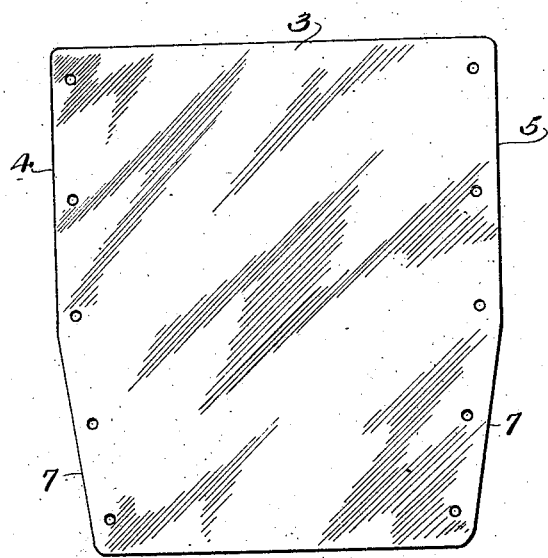
Figure 4 is a plan view of the blank from which the container is formed.

As thus far described, a container is provided of substantially oval shape and which is open at its opposite ends. It is desirable, although not absolutely essential, that one end of the container be substantially smaller than the other so as to prevent the lure from being carelessly pushed entirely through the container. For this purpose the blank 5 is shown as having its edges 4 and 5 beveled off as indicated by the numeral 7 (Figures 1 and 4). Thus when the rivets or other fastening means are passed through the contacting edges 4 and 5 the container will assume the general outline as indicated in Figure 1, so as to provide a relatively small opening 8 at the lower end of the figure and a larger opening 9 at the top thereof. Obviously, this same relative proportion between the sizes of the two openings of the holder could be provided with a rectangular blank, it only being necessary that the line of fastening means be inclined toward the fold or looped portion of the container adjacent one end thereof.

In operation, the container as shown in Figure 3 is ready to receive the artificial bait 1. As the bait is forced into the container the side walls thereof are spread apart as shown in Figure 2 and if found desirable this spreading or bulging of the side walls of the container may be brought about by squeezing toward each other the two edges of the container, and the lure then allowed to drop into the container. After pressure is relieved from the edges of the container the resiliency of the material will cause the same to contract or flatten out the side walls of the container so as to bring them into gripping contact with the bait, thereby tightly holding the bait within the container and eliminating the need of a closure for either or both ends of the holder. Furthermore, by reason of the use of transparent material in constructing the novel holder, the bait may be inspected without removing the same from the container, thereby permitting the fisherman to inspect any number of baits thus contained within the holders and select the desired bait without the need of withdrawing the baits from their receptacles.

In use, the several artificial baits are placed individually in the separate holders and the latter may be placed in any type of receptacle together with the fish lines and other tackle, and when it is desired to employ one of the baits the user may, by merely glancing over the several holders with their contained lures or baits, select the one desired and remove it from its container for use. After being used the bait is returned to its holder in the manner heretofore described and returned to the larger receptacle or placed in the pocket of the clothing as desired. By means of the holder the fish hooks are nicely held in position so as to avoid any liability of their points engaging or becoming entangled with other apparatus with which it may be stored; and furthermore, by reason of the fact that an open ended container is used the air is allowed to circulate about the bait and thus facilitates its drying out after use.

From the foregoing description taken in connection with the accompanying drawing, it will be observed that I have devised an exceedingly simple and inexpensive construction of bait holder which is comprised solely of a single sheet of resilient material, which is folded upon itself into substantially oval or elliptical form with its edges secured together by a simple fastening means. It will also be observed that in addition to the simplicity and inexpensiveness of the holder the same provides a convenient and practical means for storing artificial baits, for permitting their rapid drying out after use, and for permitting the selection of the bait desired from among a number of baits similarly stored with the least possible inconvenience. Moreover, this construction of holder also allows the ready removal of the lure from the container even with the use of one hand, if occasion should arise.

In accordance with the patent statutes I have described what I now believe to be the preferred embodiment of my invention, but it will be readily understood that minor changes in details of construction may be made without departing from the essential features of the invention and all such modifications are intended to be included within the scope of the appended claim.

What I claim as new and desire to secure by Letters Patent is:

A bait holder comprising a single sheet of transparent material doubled upon itself into an open-ended container of substantially oval cross section, and means for permanently securing together the overlapping edges of said sheet.

KENT W. HUGHES.